Oct. 12, 1965  B. I. ULINSKI  3,211,466
STEERING SYSTEM FOR AN INDUSTRIAL TRUCK
Filed April 1, 1963  2 Sheets-Sheet 1
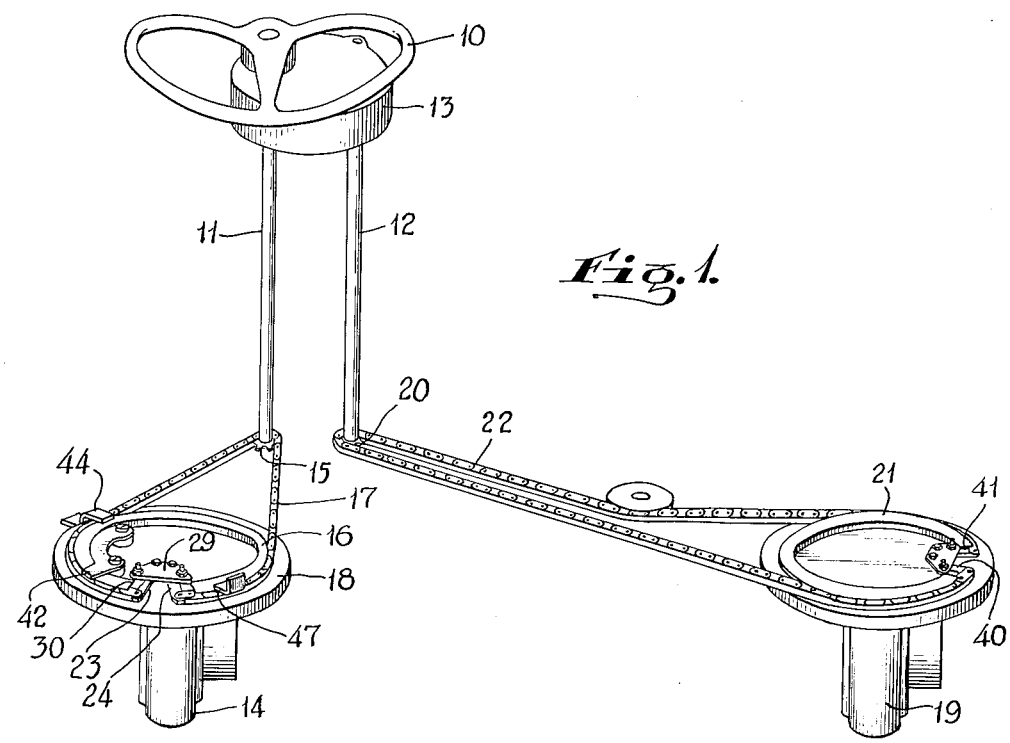
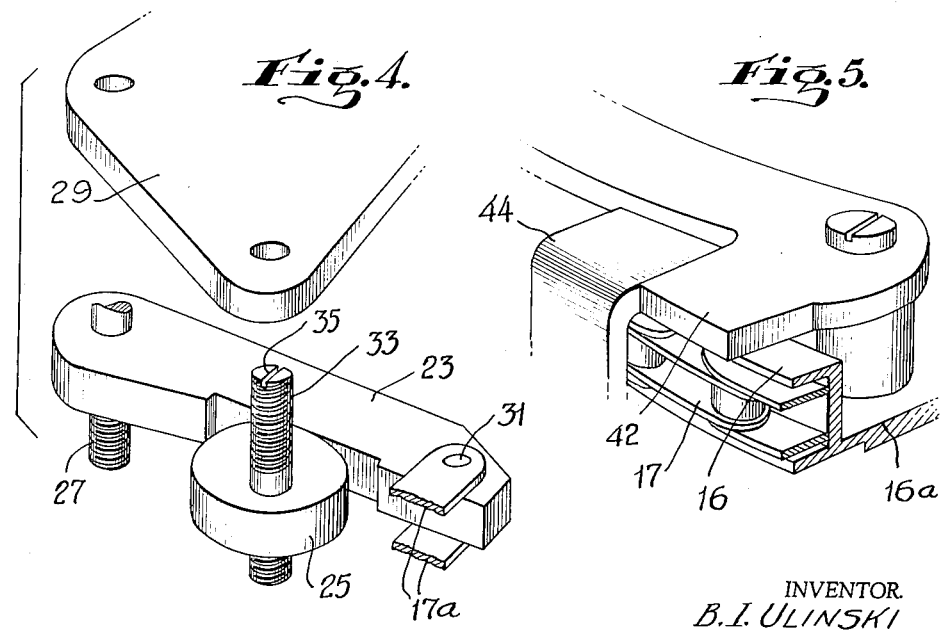
INVENTOR.
B. I. ULINSKI
BY
ATTORNEY Oct. 12, 1965   B. I. ULINSKI   3,211,466
STEERING SYSTEM FOR AN INDUSTRIAL TRUCK
Filed April 1, 1963   2 Sheets-Sheet 2

INVENTOR.
B. I. ULINSKI
BY
ATTORNEY

United States Patent Office 3,211,466
Patented Oct. 12, 1965

3,211,466
STEERING SYSTEM FOR AN INDUSTRIAL TRUCK
Bronislaus I. Ulinski, Flossmoor, Ill., assignor, by mesne assignments, to Yale & Towne, Inc., New York, N.Y., a company of Ohio
Filed Apr. 1, 1963, Ser. No. 269,592
5 Claims. (Cl. 280—93)

This invention relates to an industrial truck and in particular to a steering system for an industrial truck of the type having two steering wheels, each separately mounted for steering in a vertical axis.

In industrial trucks of this type, the steering wheels are commonly steered through chain and sprocket drives, including sprockets connected to the steering wheels and rotatable with these wheels in the steering axis. Thus, driving sprockets are connected with the steering handle, and chains connect each driving sprocket with one of the steering wheel sprockets. Such an arrangement permits the steering system to be easily adapted to the limited space available on such a truck. At the same time, the system provides a mechanical advantage between the steering handle and the steerable wheels to facilitate steering of the truck.

Such an arrangement, however, presents a problem in a truck incorporating two steerable wheels in which the relative positions of the two steerable wheels must be carefully correlated to provide geometric steering of the wheels. This is because such a system does not allow fine adjustment to be made between the positions of the two wheels, as the smallest adjustment that can be made is equal to one length of one link of the chain. Nor is it easy to make adjustments as the drive chains and sprockets wear.

The purpose of my invention is to provide a steering structure having all the advantages of the prior art, but which at the same time can be quickly and easily finely adjusted to provide precise correlation between the positions of the steerable wheels.

To this end, my invention includes sheaves instead of sprockets rotatable with the steering wheels. The flexible drive elements or chains are made non-continuous, and the ends of the chains extend from each of two steering sprockets around each of the sheaves of the steering wheels and are adjustably anchored thereto. As there are no teeth in the sheaves, the flexible drive elements or chains may be easily adjusted relatively to the sheaves to provide precise correlation between the positions of the steering wheels.

Further, through utilizing the invention of my application, I can readily obtain true geometric steering and true wheel alignment, by very simple means.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawings;

FIG. 1 is a perspective view of a steering system constructed in accordance with the invention;

FIG. 4 is an exploded perspective view of a part of the means through which the chain is adjustably anchored to the sheave; and FIG. 5 is a perspective view of the stop arrangement which limits steering movement of one of the wheels in one direction.

Figure 2:
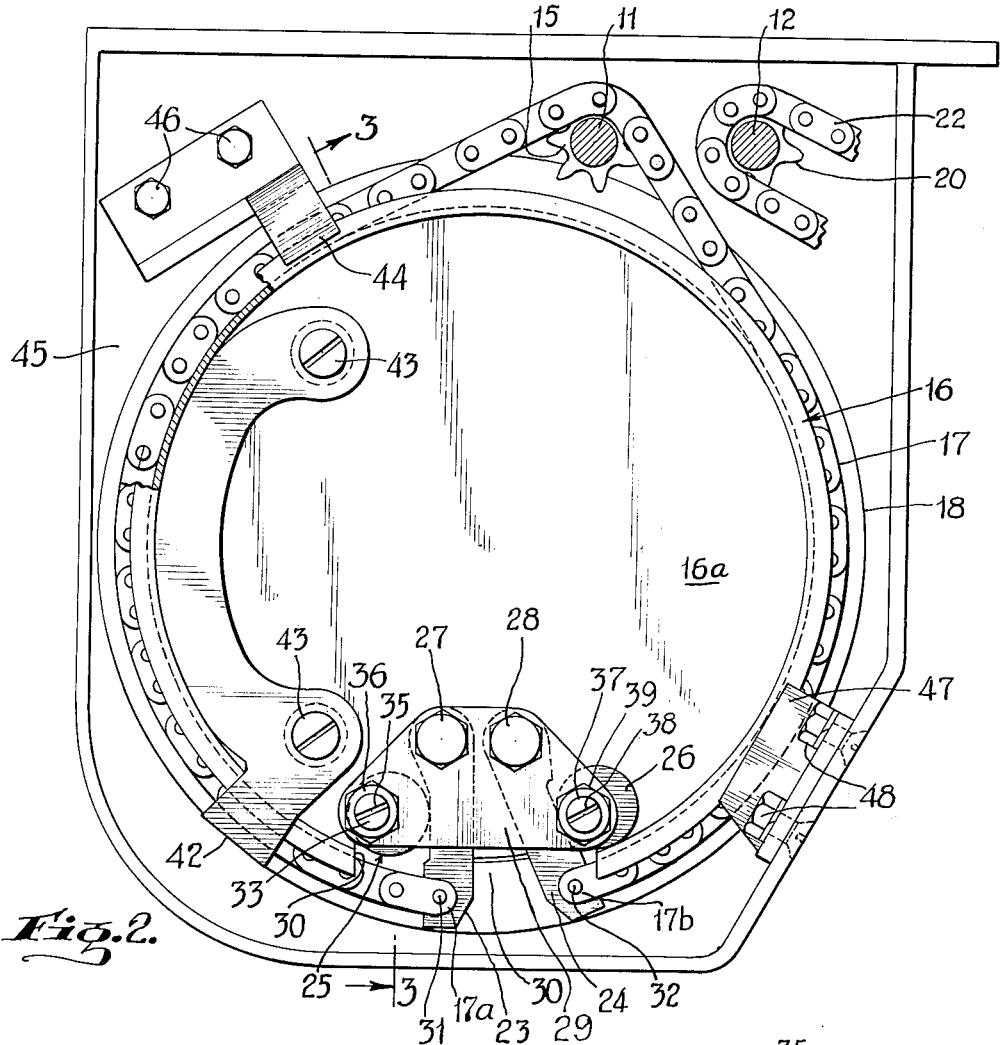
FIG. 2 is a plan view of the steering arrangement for one of the steerable wheels shown in FIG. 1.

Referring to the drawings, and in particular to FIG. 1, there is shown a steering system constructed in accordance with the invention. To facilitate explanation, the steering system is shown disassociated from the other truck structure.

The steering system includes a steering handle or wheel 10, a pair of vertically extending steering shafts 11 and 12 and a differential mechanism 13, which connects the steering handle 10 with the steering shafts 11 and 12 so that rotation of the steering handle 10 rotates the steering shafts 11 and 12 at different speeds to provide geometric steering. The differential mechanism 13 may be of the type shown in my co-pending application, Serial No. 128,404, filed August 1, 1961, now abandoned, and entitled "Steering Mechanism for Industrial Truck."

While not shown in FIG. 1, it will be appreciated that the differential mechanism 13 is suitably secured to a part of the truck frame adjacent the operator's platform, and that suitable bearings, also secured to the truck frame, support the shafts 11 and 12 for rotation.

The lower end of the shaft 11 is connected to a steerable, ground engaging, supporting wheel 14 by means of a chain drive including, a chain sprocket 15 secured to the lower end of the shaft 11, a sheave 16 which is secured to the wheel 14, and a chain 17 which interconnects the sprocket 15 and the sheave 16. The wheel 14 and sheave 16 are suitably mounted for steering rotation about a vertical axis relatively to the truck frame by means of a bearing 18, best shown in FIG. 3.

The lower end of the shaft 12 is similarly connected to a steerable, ground engaging, supporting wheel 19 by means of a sprocket 20 which is secured to the lower end of the shaft 12, a sheave 21 which is secured to the steerable wheel 19 and a chain 22 which interconnects the sprocket 20 and the sheave 21. The sheave 21 and wheel 19 are similarly mounted for steering rotation about a vertical axis.

With this arrangement, rotation of the steering handle 10 effects simultaneous steering rotation of the wheels 14 and 19 with either wheel 14 or 19 rotating faster than the other, depending on the direction or rotation of the handle 10, to provide geometric steering of the wheels 14 and 19. As previously described, this difference in speed in steering rotation between the wheels 14 and 19 is provided by the differential mechanism 13.

It will be appreciated that the relative positions of the steerable wheels 14 and 19 and the differential mechanism 13 must be carefully correlated in order to provide precise geometric steering of the wheels 14 and 19. This presents no problem in the steering arrangement of the invention in that fine adjustments in the relative positions of the wheels 14 and 19 and the differential mechanism 13 may be quickly and easily made.

This is made possible through utilization of the sheaves 16 and 21 instead of chain sprockets, and by adjustably connecting the chains 17 and 21 to the sheaves. Thus, the positions of the sheaves 16 and 21, together with the wheels 14 and 19 to which they are attached, may be adjusted relatively to the chains 17 and 22, and therefore to the differential mechanism 13 by merely adjusting the points of connection of the chains with the sheaves. As the sheaves 16 and 21 have no teeth, infinite adjustment can be made.

In the particular form of the invention illustrated in the drawings, the chain 17 is made non-continuous and the free ends of the chain are adjustably connected to the sheave 16 through levers 23 and 24, best shown in FIG. 2, which are pivotally attached to the sheave 16. Adjustments in the pivotal positions of the levers 23 and 24, and therefore the point of connection of the ends of the chain 17 to the sheave 16 may be quickly and easily made through rotation of adjusting cams 25 and 26 which engage the levers 23 and 24.

Figure 3:
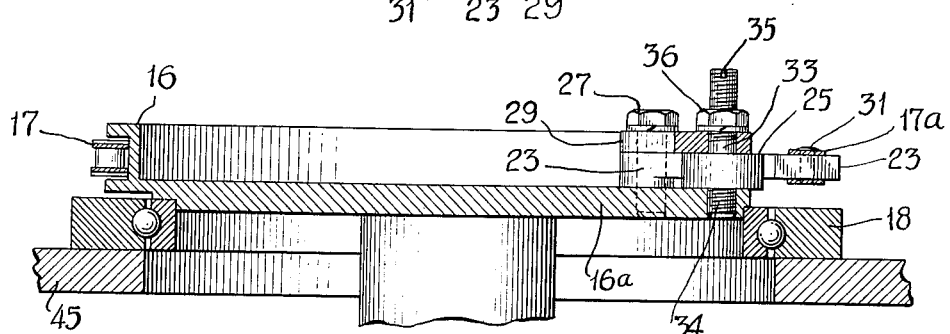
FIG. 3 is a sectional view taken on the line 3—3 of FIG. 2.

As best shown in FIGS. 2 and 3, the levers 23 and 24 are pivotally attached to the sheave 16 through bolts 27 and 28 which extend through a plate 29, through levers 23 and 24 and are threaded into the web 16a of the sheave 16. The sheave 16 is cut away at 30 to allow the outer ends of the levers 23 and 24 to extend outwardly of the sheave 16 and an end 17a of the chain 17 is pivotally attached by means of a pin 31 to the outer end of the lever 23 and the other end 17b of the chain 17 is pivotally attached to the outer end of the lever 24 by a pin 32.

As best shown in FIG. 3, the cam 25 is formed integrally with or secured to a screw 33, with the axis thereof eccentric to the axis of the screw. Screw 33, in turn, is journalled in the plate 29 above the cam 25 and is journalled at its lower end in an opening 34 in the web 16a of the sheave 16. The screw 33 has a slot 35 in the outer end thereof which is adapted to receive a screw driver whereby the screw 33 may be rotated to thereby rotate the cam 25 to adjust the pivotal position of the lever 23. The cam 25 is adapted to be locked in adjusted position by a locking nut 36 which is threaded on the screw 33 on the opposite side of the plate 29 from the cam 25, whereby tightening of the nut 36 clamps the cam 25 to the plate 29.

The cam 26 is similarly secured to a screw 37 which is also journalled for rotation in the plate 29 above the cam 26 and journalled at the lower end in the web 16a of the sheave 16. The screw 37 may be rotated through a slot 38 in the outer end thereof and is adapted to be locked in adjusted position by a lock nut 39.

With this arrangement, the point of attachment of the chain 17 with the sheave 16 may be quickly and easily adjusted relatively to the sheave 16, by loosening lock nuts 36 and 39, rotating the cams 25 and 26 through rotation of the screws 33 and 37 to pivot both the levers 23 and 24 in the same direction. When properly adjusted, the lock nuts 36 and 39 are again tightened to hold the cams 25 and 26 in the adjusted position. To further ensure locking of the levers 23 and 24 in the adjusted position, the bolts 27 and 28 may be further tightened to clamp the levers against the web 16a of the sheave 16. The web provides a horizontal surface for attachment of the levers and the groove in the outer periphery of the sheave provides a vertical surface for engagement by the chain. The tension in the chain 17 may be similarly adjusted by pivoting the levers toward or away from each other.

The free ends of the chain 22 are similarly connected to the sheave 21 through levers 40 and 41 which are pivotally attached to the sheave 21 and may be adjusted in the same manner described in conjunction with the levers 23 and 24.

Referring now to FIG. 2, a stop member 42 is secured to the sheave 16 by means of screws 43 and extends outwardly of the periphery of the sheave 16. In one direction of rotation of the sheave 16 and wheel 14, the stop 42 engages a stop 44, which is secured to the truck frame 45 by screws or bolts 46, to thereby limit steering rotation in that direction. This engagement of the stop 42 with the stop 44 is shown in FIG. 5. In the opposite direction of rotation of the sheave 16 and wheel 14, stop 42 engages a stop 47, which is secured to the truck frame by bolts 48, to limit steering rotation in the opposite direction.

From the preceding description, it can be seen that there is provided a novel steering system whereby infinite adjustment may be quickly and easily made to provide precise alignment between the wheels and to provide exact correlation between the positions of the wheels and the differential mechanism to provide precise geometric steering. The arrangement also permits adjustment in the tension in the steering chains to be quickly and easily made. While not shown, it will be appreciated that electrical drive motors may be mounted on the sheaves 16 and 21 for driving the wheels 14 and 19, so that the wheels are both steering and driving wheels.

While one form of the invention has been shown and described, it will be appreciated that this is for the purpose of explanation and illustration and that changes and modifications may be made therein without departing from the spirit and scope of the invention.

I now claim:

1. In a combination of the class described, a manually rotatable steering wheel, a drive mechanism actuated thereby, a pair of spaced shafts driven in steering relation by said drive mechanism and extending downwardly from said drive mechanism, a sprocket driven by each shaft, a pair of steering ground wheels, a sheave secured to each wheel whereby rotation of said sheave effects steering movement of said wheel, each sheave having a horizontal surface and a vertical peripheral surface, a pair of levers pivotally attached to the said horizontal surface of each sheave, a length of chain in engagement with each procket and attached at opposed ends to the ends of said levers, means for adjusting the pivotal positions of said levers relatively to the sheaves whereby to adjust the points of connection of the chains with the sheaves, and means for locking said levers in adjusted pivotal positions.

2. In a combination of the class described, a manually rotatable steering wheel, a geometric drive mechanism actuated thereby, a pair of spaced shafts driven in geometric steering relation by said drive mechanism and extending downwardly from said drive mechanism, a sprocket driven by each shaft, a pair of steering ground wheels, a sheave secured to each wheel whereby rotation of said sheave effects steering movement of said wheel, a pair of levers pivotally attached to each sheave, a length of chain in engagement with each sprocket and attached at opposed ends to the ends of said levers, means for adjusting the pivotal positions of said levers relatively to the sheaves whereby to adjust the points of connection of the chains with the sheaves, and means for locking said levers in adjusted positions to prevent movement of said opposed ends of said chain relatively to said sheaves.

3. In a combination of the class described, a manually rotatable steering wheel, a drive mechanism actuated thereby, a pair of spaced shafts driven in steering relation by said drive mechanism and extending downwardly from said drive mechanism, a sprocket driven by each shaft, a pair of steering ground wheels, a sheave secured to each wheel whereby rotation of said sheave effects steering movement of the wheel, a pair of levers pivotally attached to each sheave, a length of chain in engagement with each sprocket and attached at opposed ends to the ends of said levers, rotatable cam means for adjusting the pivotal positions of said levers relatively to the sheaves whereby to adjust the points of connection of the chains with the sheaves, and means for locking said levers in adjusted positions whereby to prevent movement of said opposed ends of said chains relatively to said sheaves.

4. In a combination of the class described, a manually rotatable steering wheel, a drive mechanism actuated thereby, a pair of spaced shafts driven in steering relation by said drive mechanism and extending downwardly from said drive mechanism, a sprocket driven by each shaft, a pair of steering ground wheels, a sheave secured to each wheel whereby rotation of said sheave effects steering movement of said wheel, at least one lever pivotally attached to each sheave, a length of chain in engagement with each sprocket and attached at opposed ends to said sheaves with at least one end of each chain being connected to the sheave through said lever, means for adjusting the pivotal position of each lever relatively to the sheave and to lock each lever in an adjusted position whereby to prevent movement of the end of the chain relatively to the sheave.

5. In a combination of the class described, a manually rotatable steering wheel, a drive mechanism actuated thereby, a pair of spaced shafts driven in steering relation by said drive mechanism and extending downwardly from said drive mechanism, a sprocket driven by each shaft, a pair of steering ground wheels, a sheave secured to each wheel, each sheave having a vertical surface for engagement by a length of chain which also engages one of said sprockets, a horizontal surface on each sheave which extends radially inwardly of said vertical surface, at least one member attached to said horizontal surface which is movable in a plane parallel to said horizontal surface, said length of chain engaging said sprocket and said vertical surface and attached at both ends to said sheave with at least one end of said chain being connected to said sheave through said member whereby rotation of the sprocket effects steering movement of said wheel, means for adjusting the positions of said member relative to the sheave whereby to adjust the points of connection of the chains with the sheaves, and means for locking said member in adjusted positions whereby to prevent movement of the ends of said chains relative to said sheaves.

References Cited by the Examiner
UNITED STATES PATENTS

| | | | |
|---|---|---|---|
| 973,711 | 10/10 | Sevison et al. | 280—91 X |
| 1,001,837 | 8/11 | Fuller | 180—52 |
| 1,171,526 | 2/16 | Lancia | 188—77 |
| 1,989,092 | 1/35 | Gates | 188—77 |
| 2,097,928 | 11/37 | Konig | 74—242.8 |
| 2,197,452 | 4/40 | Fussell | 188—79.5 X |
| 2,228,247 | 1/41 | Cunningham | 280—91 |
| 2,492,816 | 12/49 | Rosman | 188—77 |
| 2,835,135 | 5/58 | Quick | 74—242.8 |
| 2,880,445 | 4/59 | Wallis | 74—242.8 |
| 3,031,024 | 4/62 | Ulinski | 74—498 |

MILTON BUCHLER, *Primary Examiner.*

A. HARRY LEVY, KENNETH H. BETTS, *Examiners.*